United States Patent [19]

Ishijima et al.

[11] 4,138,270
[45] Feb. 6, 1979

[54] AQUEOUS ALUMINUM PASTE COMPOSITION

[75] Inventors: Shizuo Ishijima, Fuji; Tsunesuke Doi, Tama, both of Japan

[73] Assignee: Asahi Kasei Kogyo Kabushiki Kaisha, Osaka, Japan

[21] Appl. No.: 803,924

[22] Filed: Jun. 6, 1977

[30] Foreign Application Priority Data

Jun. 8, 1976 [JP] Japan .................................. 51-66078

[51] Int. Cl.$^2$ ............................................. C09C 1/62
[52] U.S. Cl. .............................. 106/291; 106/308 F; 106/308 N; 106/290; 106/314; 106/97
[58] Field of Search ................. 106/290, 291, 308 F, 106/308 N, 309

[56] References Cited

U.S. PATENT DOCUMENTS

| | | | |
|---|---|---|---|
| 3,563,779 | 2/1971 | Higaki | 106/291 |
| 3,617,323 | 11/1971 | Riegler | 106/290 |

*Primary Examiner*—Winston A. Douglas
*Assistant Examiner*—J. V. Howard
*Attorney, Agent, or Firm*—Sprung, Felfe, Horn, Lynch & Kramer

[57] ABSTRACT

A novel aqueous aluminum paste composition comprising specific amounts of a fatty acid, a fatty acid alkanolamide and a nonionic surface active agent other than the fatty acid alkanolamide as well as aluminum flakes, and water. The aqueous aluminum paste composition is well dispersible and stably storable in water and has good bubble retention characteristics when used as a foaming agent in the manufacture of light-weight foamed concrete.

9 Claims, 4 Drawing Figures

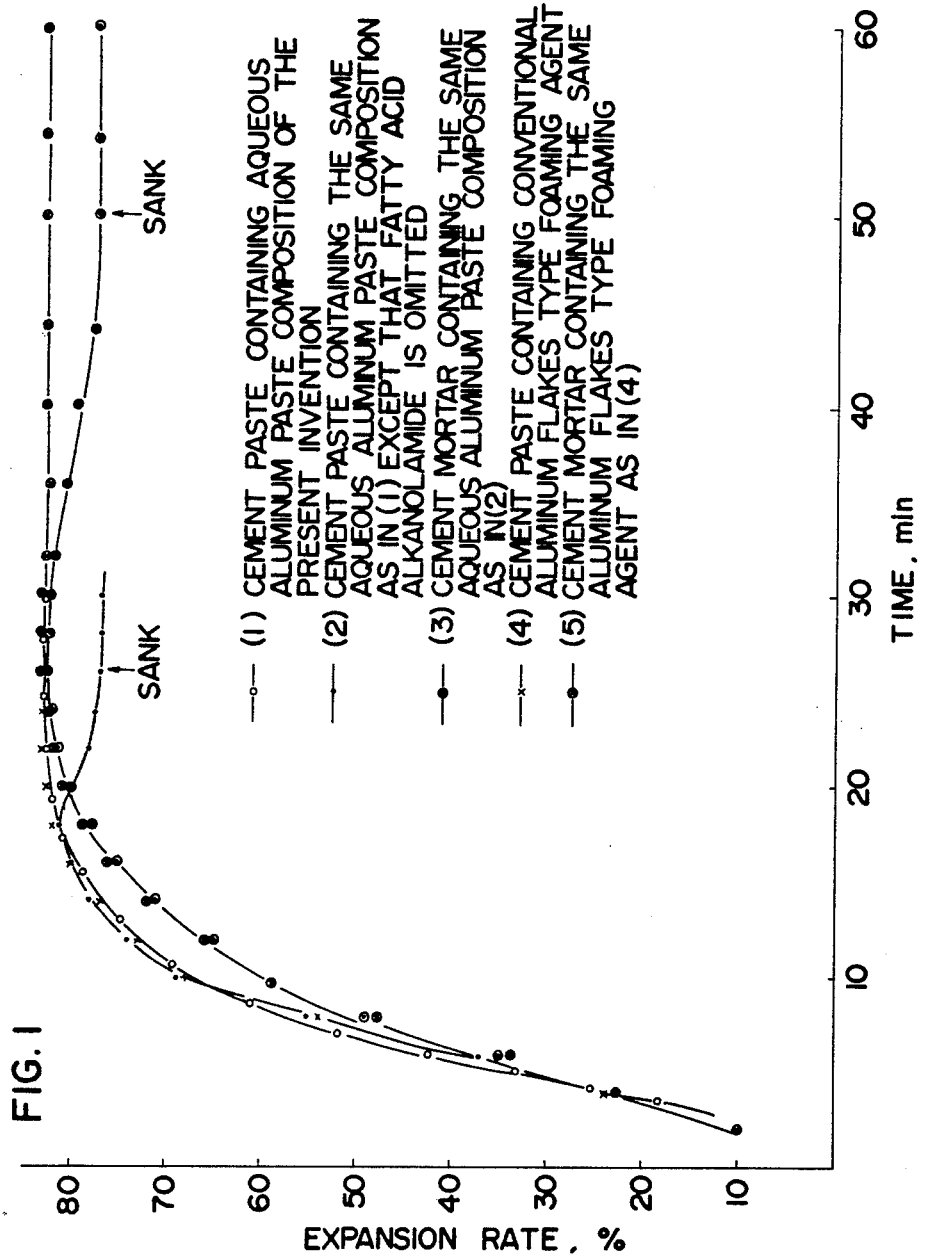

FIG. 2 INSTRUMENT FOR WATER STABILITY TEST
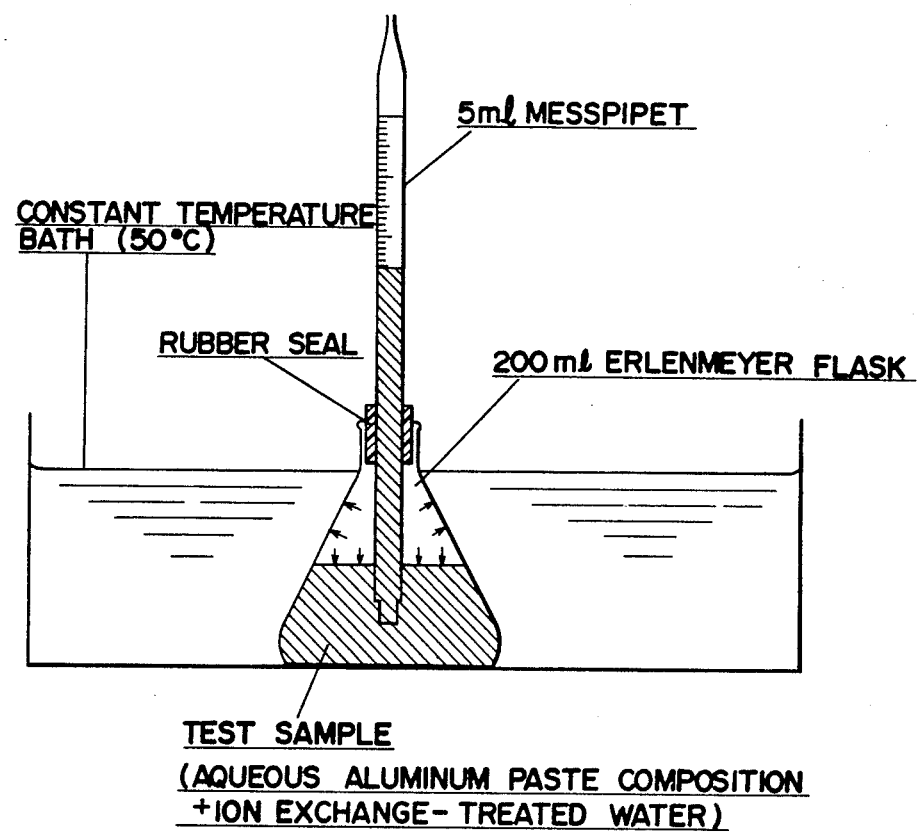

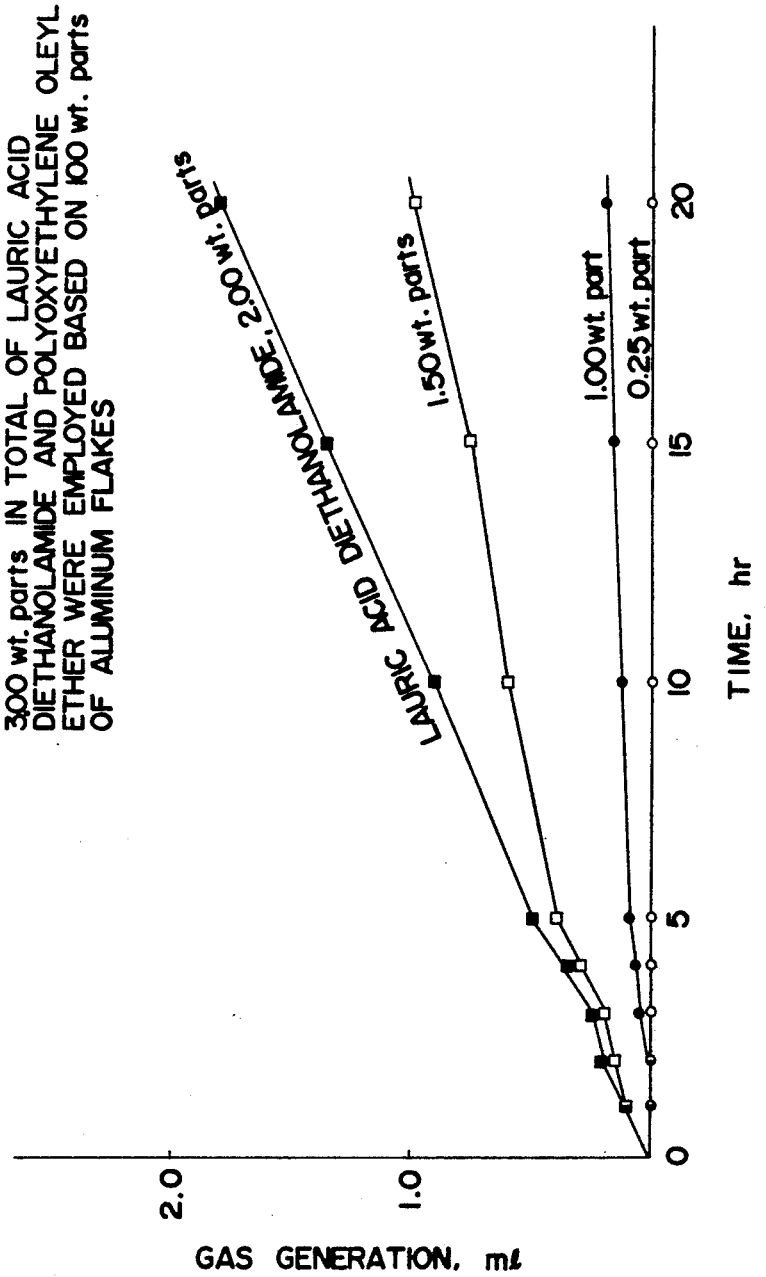

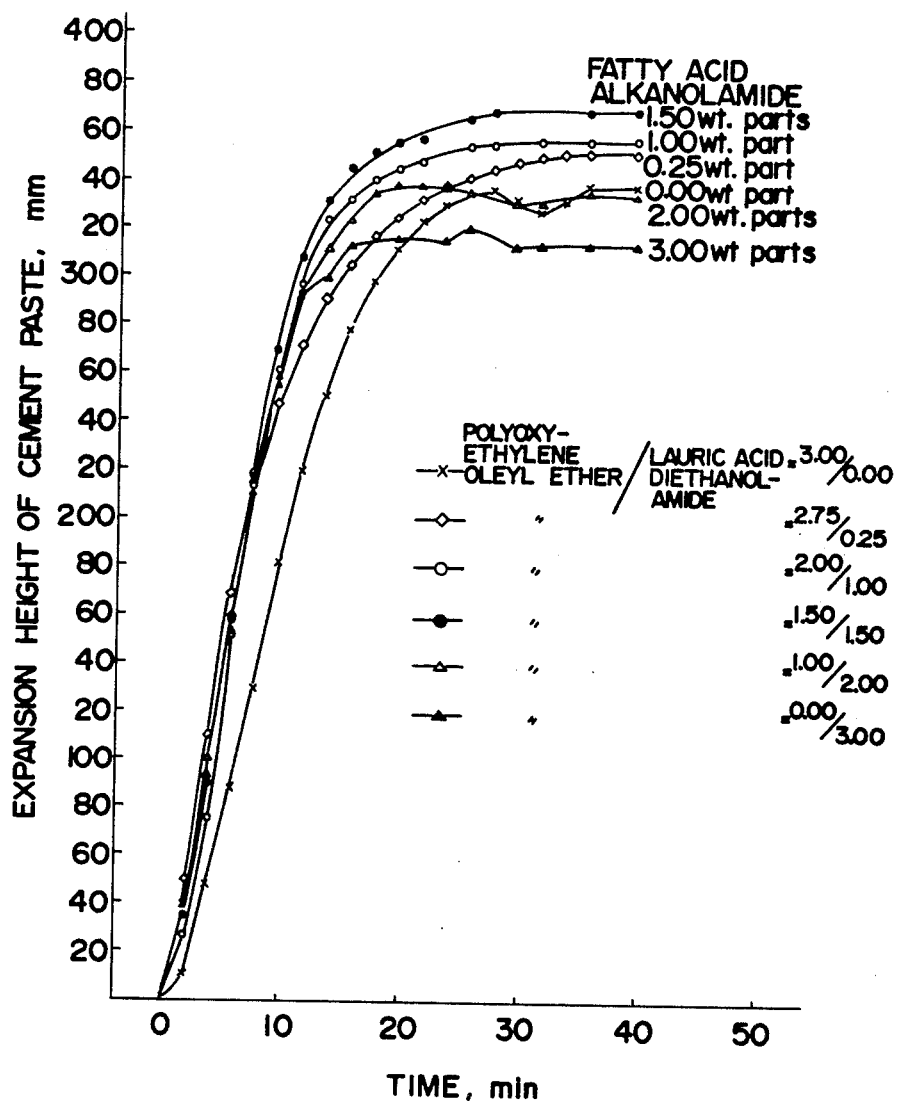
FIG. 4 EFFECT OF AMOUNT OF FATTY ACID ALKANOLAMIDE ON FOAMING CHARACTERISTICS

AQUEOUS ALUMINUM PASTE COMPOSITION

This invention relates to an aqueous aluminum paste composition dispersible in water. More particularly, this invention relates to an aqueous aluminum paste composition which is not only employable for water-based paints or water-based adhesives but also employable with great advantages for manufacture of light-weight foamed concrete as foaming agents, imparting much improved bubble retention.

It is known that aluminum flakes are employed for the manufacture of porous cement products, e.g., light-weight foamed concrete or porous mortar or stucco, or manufacture of plastics foams, where a gas generated by the reaction between aluminum and an acid or alkaline medium is utilized for foaming or expansion of the substrate material. The use of aluminum flakes as a foaming agent for the manufacture of concrete etc. is shown for example in Siegfried Reinsdorf, "Leichtbeton", 1962.7, U.S. Pat. No. 1,087,098, etc. On the other hand, when an aluminum paste composition is employed for these uses, the aluminum paste is essentially required not only to have good water dispersibility and chemical stability sufficient to endure long term storage but also to minimize employment of organic solvents from the view point of prevention of environmental pollution and to control degassing which will influence the quality of foamed products because the violent degassing will give fatal damage to the foamed products.

Heretofore there have been known various methods to prepare a water-dispersible aluminum paste composition. For example, there has been proposed a method wherein an anionic surface active agent is added in the milling of aluminum in a petroleum solvent and an oil-soluble nonionic surface active agent is added after the milling. The paste composition obtained according to this method is inferior in water dispersibility and has a problem of environmental pollution which should be avoided from the view point of the health of workers in the manufacturing factories.

In another proposed method for preparing aluminum paste composition, aluminum is subjected to milling in an aqueous medium. The paste composition obtained according to this method is free from such disadvantages as mentioned above, but it has another problem in storage stability. Some reaction inhibitor may be used to improve the storage stability, but the reaction inhibitor, when employed, also acts to suppress foaming in manufacturing light-weight foamed concrete, deteriorating the quality of foamed products.

Thus, the aluminum paste compositions obtained according to the conventional methods inevitably have their respective shortcomings. In view of these shortcomings of the conventional aluminum paste compositions, aluminum flakes as such have been widely used as the foaming agent for the manufacture of a foamed concrete despite their some drawbacks in handling, e.g., danger of explosion.

The inventors of the present invention have made studies to develop an aqueous aluminum paste composition which is free from all the defects inherent in the respective conventional aluminum paste compositions and does not cause environmental pollution in the course of preparation.

Stated illustratively, the present inventors have made extensive and intensive studies on the factors which would influence the chemical stability of aluminum flakes in water with a view to solving the problems of the conventional techniques and unexpectedly found that the chemical stability of aluminum flakes can be effectively increased by forming thin film layer on the aluminum flakes with a specific material in a certain thickness (determined depending on the amount used of the material), so that generation of hydrogen gas may be minimized when the aluminum flakes are stored with water. More specifically, it has been found that when 0.1 to 10 parts by weight of at least one fatty acid is added to 100 parts by weight of aluminum, preferably as a lubricant in the milling of the aluminum into flakes, there are formed uniform thin films of the fatty acid on the surfaces of aluminum flakes, which uniform thin films give the aluminum flakes good chemical stability.

Further, in the course of the inventors' full study on the factors which are considered to control the foaming in the manufacture of light-weight foamed concrete, it has been found that fatty acid alkanolamide has remarkable bubble retention characteristics and excellent effect for the prevention of violent degassing which would fatally spoil the quality of foamed products. The term "violent degassing" as used herein means that hydrogen gas generated in the course of foaming of cement etc. is degassed drastically and locally at weak points, collapsing bubbles formed in the foaming. Such violent degassing often leads to formation of undesirable marks due to degassing or sinking in the foamed products, and sometimes leads to catastrophic destruction of the final molded product.

Still further, it has been found that the employment of, in combination, specific amounts of a fatty acid alkanolamide and a nonionic surface active agent other than the fatty acid alkanolamide and the above-mentioned aluminum flakes having uniform thin films of a fatty acid formed thereon, can give excellent characteristics to an aqueous aluminum paste composition prepared therefrom. Stated illustratively, aluminum material and a fatty acid were charged in a ball mill and subjected, according to an ordinary wet milling method, to milling in an atmosphere of air and in the presence of an organic solvent, to give aluminum flakes on which uniform thin films of the fatty acid are coated in an amount of 0.1 to 10 parts by weight per 100 parts by weight of the aluminum flakes. To the thus prepared aluminum flakes coated with the fatty acid are added 0.01 to 1.0 parts by weight of a fatty acid alkanolamide and 0.5 to 4.0 parts by weight of a nonionic surface active agent other than the fatty acid alkanolamide, each per 100 parts by weight of the aluminum flakes, and kneaded with a predetermined amount of water to form a uniform mixture, whereby there is prepared a desired aqueous aluminum paste composition which has well-balanced characteristics, namely excellent water dispersibility and storage stability and excellent bubble retention when used as a foaming agent for the manufacture of light-weight foamed concrete.

It is therefore one and principal object of the present invention to provide an aqueous aluminum paste composition which is free from every defect of the conventional aluminum paste compositions, improved in water dispersibility and storage life, and has improved bubble retention when used as a foaming agent in manufacture of light-weight foamed concrete.

According to the present invention, there is provided an aqueous aluminum paste composition comprising 100 parts by weight of aluminum flakes, 0.1 to 10 parts by weight of at least one fatty acid, 0.01 to 1.0 part by weight of at least one fatty acid alkanolamide, 0.5 to 4.0 parts by weight of a nonionic surface active agent other than the fatty acid alkanolamide and water in an amount sufficient to render the composition pasty, the total amount of the fatty acid alkanolamide and the nonionic surface active agent being at least 1.0 part by weight.

The invention will be better understood from the following description taken in connection with the accompanying drawings in which:

FIG. 1 is a graph showing an expansion rate of various cement pastes each including respective aluminum type foaming agents;

FIG. 2 is a diagrammatical sectional view of an instrument for water stability test;

FIG. 3 is a graph showing the effect of a fatty acid alkanolamide on water stability; and FIG. 4 is a graph showing the effect of an amount of a fatty acid alkanolamide on foaming characteristics.

As aluminum flakes effectively employable in the present invention, there can be mentioned conventional aluminum flakes used for paints, conventional aluminum flakes used as a foaming agent for manufacturing light-weight foamed concrete, etc. Aluminum granules may be used in substitution for aluminum flakes. A purity of aluminum is not critical. Aluminum of 90% or more purity may be employed although aluminum of 99.5% or more purity is generally used for paints. Aluminum flakes employed in the present invention preferably have a size that the sieve residue on a sieve having 149μ sieve openings is 5% or less. Coarse aluminum flakes are not preferable as a foaming agent for cement mortar since the foaming agent including such coarse aluminum flakes has a tendency to delay termination of the foaming of cement mortar and has an adverse influence on quality of the foamed products of cement mortar.

As fatty acids to be employed in the present invention, there can be mentioned saturated fatty acids having 6 to 24 carbon atoms and unsaturated fatty acids having 6 to 24 carbon atoms. For example, there may be used caproic acid, enanthic acid, caprilic acid, pelargonic acid, undecanoic acid, lauric acid, tridecanoic acid, myristic acid, pentadecanoic acid, palmitic acid, margaric acid, stearic acid, nonadecanoic acid, arachic acid, behenic acid, lignoceric acid, zoomaric acid, oleic acid, eloidic acid, erucic acid, linolic acid, linolenic acid, ricinoleic acid and selacholeic acid. These fatty acids may be used alone or in mixture. Normal saturated fatty acid having 12 to 22 carbon atoms may preferably be used. Specific examples of them include lauric acid, myristic acid, palmitic acid, stearic acid, arachic acid, behenic acid, etc. The fatty acid is usually added, in an amount of 0.1 to 10 parts by weight per 100 parts by weight of aluminum flakes, as a lubricant in the milling step or the kneading step in the process for preparing the aqueous aluminum paste composition. There cannot be obtained a sufficient water stability of the aluminum paste composition in case the amount of the fatty acid added to aluminum flakes is less than 0.1 part by weight. In case more than 10 parts by weight of fatty acid are employed, the aluminum paste composition prepared is excellent in water stability, but it is extremely difficult not only to formulate the aluminum flakes into an aqueous paste but also to impart to the prepared aqueous paste composition good water dispersibility.

As mentioned before, according to the present invention, there are employed surface active agents so that the aluminum flakes may be easily formulated into an aqueous paste and at the same time the prepared aqueous aluminum paste composition may have a good water dispersibility. Surface active agents to be employed in the present invention are necessarily those serving to impart water dispersibility to the aluminum flakes as well as the aluminum paste composition prepared therefrom but having no adverse influence on the water stability or storage stability of the aqueous aluminum paste composition. In this connection, it should be noted that, according to the present invention, the surface active agents include, in combination, a fatty acid alkanolamide and a nonionic surface active agent other than the fatty acid alkanolamide.

Amounts of the fatty acid alkanolamide and the nonionic surface active agent other than the fatty acid alkanolamide are critical. There should be employed a fatty acid alkanolamide in an amount of 0.01 to 1.0 part by weight, preferably 0.1 to 0.5 part by weight and a nonionic surface active agent in an amount of 0.5 to 4.0 parts by weight, per 100 parts by weight of aluminum flakes. In addition, the total amount of the fatty acid alkanolamide and the nonionic surface active agent should be at least 1.0 part by weight per 100 parts by weight of the aluminum flakes. In case the total amount of the fatty acid alkanolamide and the the nonionic surface active agent is less than 1.0 part by weight, the aluminum paste composition obtained is hardly dispersed in water and not desired in the present invention.

Incorporation of these surface active agents as mentioned above into the present aluminum paste composition may be effected in such a manner that they are added to a slurry prepared by mixing the aluminum flakes with a solvent such as mineral spirit, in advance to the filtration step in the preparation process of the present aluminum paste composition (which process will be described later), or in the kneading step after the filtration. The fatty acid alkanolamide and the nonionic surface active agent may be added at the same time or separately.

The fatty acid alkanolamide is used, as mentioned above, in an amount of 0.01 to 1.0 part by weight, and preferably 0.1 to 0.5 part by weight, per 100 parts by weight of the aluminum flakes. In case less than 0.01 part by weight of the fatty acid alkanolamide is used, the aqueous aluminum paste composition obtained is not good in bubble retention when used as a foaming agent in the manufacture of a light-weight foamed concrete, so that a good foamed product cannot be obtained. In case more than 1.0 part by weight of the fatty acid alkanolamide is used, the bubble retention characteristics of the obtained aluminum paste is relatively good but undesired gas generation is caused by the reaction of fatty acid alkanolamide with aluminum during storage.

As the fatty acid alkanolamides to be employed in the present invention, there can be mentioned two types of fatty acid alkanolamides.

One type of the fatty acid alkanolamides is condensation products of alkanolamine and is presumed to have the following formula:

(I)

wherein A stands for H or —R$_2$OH, R$_1$ stands for an alkyl group having 8 to 24 carbon atoms or an alkenyl group having 8 to 24 carbon atoms and R$_2$ for an alkylene group having 2 to 4 carbon atoms As apparent from the formula (I), they include fatty acid dialkanolamides and fatty acid monoalkanolamides, and may be easily prepared by reacting a dialkanolamine or monoalkanolamine with a methyl or ethyl ester of fatty acid as described in, for example, Japanese Patent Application Publication No. 13622/1961.

Specific examples of the fatty acid dialkanolamides of the formula (I) to be usually employed include lauric acid diethanolamide, stearic acid diethanolamide, oleic acid diethanolamide, linseed oil fatty acid diethanolamide, soybean oil fatty acid diethanolamide, coconut oil fatty acid diethanolamide, dehydrated castor oil fatty acid diethanolamide, tall oil fatty acid diethanolamide, safflower oil fatty acid diethanolamide, etc. Besides, there may also be employed fatty acid dipropanolamides and fatty acid dibutanolamides prepared using as a dialkanolamine dipropanolamine and dibutanolamine, respectively.

Specific examples of the fatty acid monoalkanolamides of the formula (I) include lauric acid monoethanolamide, stearic acid monoethanolamide, oleic acid monoethanolamide, linseed oil fatty acid monoethanolamide, soybean oil fatty acid monoethanolamide, cococut oil fatty acid monoethanolamide, lauric acid monoisopropanolamide, stearic acid monoisopropanolamide, oleic acid monoisopropanolamide, coconut oil fatty acid monoisopropanolamide, etc.

Another type of the fatty acid alkanolamides employable in the present invention is reaction products of fatty acid and dialkanolamide. The reaction products are presumed to have the following formula:

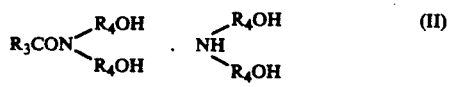

wherein $R_3$ stands for an alkyl group having 8 to 24 carbon atoms or an alkenyl group having 8 to 24 carbon atoms and $R_4$ stands for an alkylene group having 2 to 4 carbon atoms Such reaction products of the formula (II) may be obtained by reacting 2 moles of a dialkanolamine with 1 mole of a fatty acid at about 150 to about 170° C. for about 8 hours.

Specific examples of the fatty acid alkanolamides of the formula (II) include lauric acid diethanolamide, stearic acid diethanolamide, oleic acid diethanolamide, linseed oil fatty acid diethanolamide, soybean oil fatty acid diethanolamide, coconut oil fatty acid diethanolamide, etc. These fatty acid alkanolamides may be employed alone or in mixture.

As mentioned hereinbefore, the nonionic surface active agent is used in the range of 0.5 to 4.0 parts by weight per 100 parts by weight of the aluminum flakes. In case less than 0.5 part by weight of the nonionic surface active agent is used, the aluminum paste composition prepared therefrom cannot attain a good water dispersibility. In case more than 4.0 parts by weight of the nonionic surface active agent are used, the aluminum paste composition obtained therefrom cannot act as an effective foaming agent. When such paste composition is employed, the viscosity of a cement mortar is lowered, which adversely influences bubble retention of the cement mortar. As a result, the cement mortar tends to collapsedly sink in the course of expansion thereof, and even if the foamed cement mortar does not sink, it is caused to have such a default as the so-called "flaw" or "shadow".

The nonionic surface active agents to be employed in the present invention, may be chosen from various nonionic surface active agents other than fatty acid alkanolamide which are usually employed to enhance water dispersibility of the components. For example, a polyoxyalkylene alkyl ether, a polyoxyalkylene alkylphenol ether and a polyalkylene glycol fatty acid ether may be employed. The alkylene moiety in the above compounds may be ethylene alone or a random type mixture of ethylene and propylene. A block copolymer of ethylene oxide and propylene oxide may also be employed. These may be employed alone or in mixture. As specific examples, there can be mentioned polyoxyethylene octyl ether, polyoxyethylene decyl ether, polyoxyethylene lauryl ether, polyoxyethylene tridecyl ether, polyoxyethylene cetyl ether, polyoxyethylene stearyl ether, polyoxyethylene oleyl ether, polyoxyethylene octylphenyl ether, polyoxyethylene nonylphenyl ether, polyoxyethylene dodecylphenyl ether, polyethylene glycol monooctanoate, polyethylene glycol monodecanoate, polyethylene glycol monolaurate, polyethylene glycol monomyristate, polyethylene glycol monopalmitate, polyethylene glycol monostearate, polyethylene glycol monooleate, polyethylene glycol monoerucate, polyethylene glycol dioctanoate, polyethylene glycol dilaurate, polyethylene glycol distearate, polyethylene glycol dioleate, polyoxyalkylene lauryl ether (weight ratio of PO/EO=20/80, random type), polyoxyalkylene lauryl cetyl ether, and a condensation product of polyoxyethylene and polypropylene glycol.

The preparation method of the aqueous aluminum paste composition according to the present invention will be explained hereunder.

As stated before, the most prevalent aluminum paste compositions are oil-based ones which are generally prepared according to Hall's wet milling method in an oil medium or organic solvent (see, for example, U.S. Pat. No. 2,002,891). The oil-based aluminum paste compositions obtained according to this method are, however, substantially hydrophobic and non-dispersible in water. In the present invention, after the aluminum as a raw material is milled in the presence of an oil medium in the same manner as of Hall method, the oil medium is replaced by water in the presence of a surface active agent to prepare an aqueous aluminum paste composition dispersible in water.

The formulation of the aqueous aluminum composition of the present invention is:

| | |
|---|---|
| aluminum flakes | 100 parts by weight |
| fatty acid | 0.1 to 10 parts by weight |
| fatty acid alkanolamide | 0.01 to 1.0 part by weight |
| nonionic surface active agent | 0.5 to 4.0 parts by weight |
| water | (sufficient amount to render the composition pasty) |
| organic solvent | (small amount, occasionally) |

The water content is not critical but water is employed in an amount sufficient to render the composition pasty. Usually, water may be employed in an amount of about 18 to about 46 parts by weight per 100 parts by weight of the aluminum flakes. A part of the organic solvent used in the milling remain in the present aqueous aluminum paste composition.

Explained in detail, the starting aluminum pieces or foil scraps are subjected, with a small amount of a fatty acid and an organic solvent such as mineral spirit or solvent naphtha, to milling in a ball mill in an atmosphere of air or an inert gas for a predetermined time to obtain aluminum flakes mud. The organic solvent such as mineral spirit or solvent naphtha is employed in the milling because they are chemically inert and will not react with aluminum. The amount of the organic solvent to be employed may vary according to the desired particle size of aluminum flakes, but may generally be the same as that of the starting aluminum.

To take the obtained mud out of the ball mill, the mud is diluted generally with the same type of organic solvent as used in the milling to form so dilute slurry that the aluminum flakes content is about 5% by weight, and the slurry is subsequently transferred into a slurry tank.

The aluminum flakes slurry is then subjected to sifting by a sieve having sieve openings of predetermined size, for example 149$\mu$, and the undersize aluminum flakes are transferred to a tank and then subjected to filtration. The filtration is generally conducted using a filter press while drying by blowing air, until the aluminum flakes content becomes about 85% by weight to about 95% by weight.

Then, the obtained filter cake, a fatty acid alkanolamide, a nonionic surface active agent and water are charged in a ribbon blender, the amount of water being adjusted so that the weight percentage of the aluminum flakes content in the charged components becomes 65 to 75, and then kneaded there to prepare the aqueous aluminum paste composition of the present invention.

As an alternative method for the removal of the organic solvent to replace it by water, the aluminum flakes in the slurry after the sifting is washed using water and a surface active agent to remove the organic solvent contained in the slurry through emulsification separation method, or the aluminum flakes in the filter cake obtained by the filtration is similarly washed using water and a surface active agent to remove the organic solvent in the filter cake through emulsification-separation method.

The aqueous aluminum paste composition of the present invention may be used with a great advantage as a foaming agent in manufacturing light-weight foamed concrete. The light-weight foamed concrete is generally manufactured by (1) generating gas through chemical reactions, (2) incorporating a foaming agent, or (3) incorporating bubbles previously prepared. The foaming method of the present invention belongs to (1) above. This method is the most prevalent in the field of foamed concrete manufacturing, wherein aluminum flakes and quick lime are employed with a silica material. The foaming agent of the present invention is used in an ordinary manner, for example, as disclosed in U.S. Pat. No. 1,087,098 for the manufacture of light-weight foamed concrete. Generally according to the present invention, 20 to 40 parts by weight of silica powder (Blaine value: 3000 cm$^2$/g), 60 to 80 parts by weight of cement (100% undersize of 0.5 mm sieve openings), 0.06 part by weight of aluminum flakes, 43 to 51 parts by weight of water are blended for 3 minutes The obtained blend are poured into a mold and allowed to stand for about 2 hours. The cast are then treated to be hardened in an autoclave at 183° C. under a saturated steam pressure of 10 atm for 10 hours to obtain a product of light-weight foamed concrete.

The aqueous aluminum paste composition of the present invention has good dispersibility in the concrete mortar and remarkable bubble retention characteristics so that the light-weight concrete obtained using the aqueous aluminum paste composition of the present invention as a foaming agent in the manufacturing thereof is excellent in quality.

The aqueous aluminum paste composition of the present invention is further employable with advantages for water-based paints, water-based inks, water-based adhesives and water-containing explosives.

The present invention is illustrated, by way of example only, with reference to the following examples.

EXAMPLE 1

10 kg of small pieces of aluminum which had been prepared by breaking aluminum foil scraps to have an average size of about 5 mm and 10 kg of a mixture of mineral spirit and stearic acid (95:5 by weight) were charged into a ball mill and then were subjected to milling for about 8 hours. The resulting milled mixture was diluted with 20 kg of mineral spirit and the diluted mixture was put into a slurry tank. 150 kg of an aqueous 0.25% by weight polyoxyethylene lauryl ether solution was added to the mixture, and subjected to filtration using a filter press while being emulsified by agitating with DESPA (trade name of a high speed dissolver manufactured by Asada Tekko K.K., Japan) rotating at 1000 r.p.m.

The obtained filter cake contained 87% by weight of a residue of heating at 105° C. for 3 hours, 8% by weight of water and 5% by weight of mineral spirit. To 10 kg of the filter cake were charged coconut oil fatty acid diethanolamide (fatty acid alkanolamide of the aforementioned formula (I)) in an amount of 0.5% by weight based on the weight of the aluminum contained in the filter cake and water in such an amount that the weight percentage of the residue of heating is reduced to 65%. The thus obtained formulation was kneaded by a R-type ribbon blender manufactured by Tokuju Kosakusho, Japan, at 40° C. for about 30 minutes to obtain a desired aqueous aluminum paste composition which is excellent in water dispersibility, water stability and bubble retention.

In order to observe foaming characteristics of the obtained aqueous aluminum paste composition used as a foaming agent for cement, the following test was conducted. 0.43 g of the aluminum paste composition was quickly mixed with 480 g of an ordinary portland cement (JIS R 5210) manufacutured and sold by Nihon Cement Co., Ltd., Japan and 268 g of water to form a mixture (in this specification, such a mixture of an aluminum type foaming agent, an ordinary portland cement and water is hereinafter referred to as "cement paste".), and the mixture or cement paste was taken in a 1-liter messcylinder. The cement paste in the cylinder was expanded in a 40° C.-constant temperature bath. The foaming characteristics of the cement paste, especially the degree of degassing, and the expansion rate of the cement paste were measured. For comparison, the same test as mentioned was conducted except that aluminum flakes alone were used in place of the present aqueous aluminum paste composition. The results are shown in FIG. 1. It was observed that the aqueous aluminum paste composition obtained in this Example had foaming characteristics as excellent as those of the conventional foaming agent of aluminum flakes alone and could minimize violent degassing so that it had good bubble retention. Further, it was observed that the aluminum paste composition of this Example was not deteriorated even after one-year storage, retaining good water dispersibility and good foaming characteristics. Thus, it turned out that the paste composition of this Example is excellent in long-term storage stability.

For further comparison, an aqueous aluminum paste composition was prepared in the same manner as described above, except that use of coconut oil fatty acid diethanolamide was omitted. The same test was conducted and the results are also shown in FIG. 1. The thus prepared paste composition without coconut oil fatty acid diethanolamide incorporated, had good water dispersibility and water stability. But, when the cement paste including such composition, is expanded, the degree of degassing was so violent that the cement paste collapsedly sank in the course of expansion thereof.

On the other hand, in order to show that the foaming test result for the cement paste is applicable to estimate the foaming characteristics of a cement mortar for practical use, the following reference foaming tests were conducted. There were employed two formulations of the cement mortars. The formulations were prepared by mixing 40 parts by weight of silica powder [Blaine value (ASTM Bulletin 108,17 (1941) and 123,51 (1943)): 3000 $cm^2/g$], 60 parts by weight of cement (100% undersize of 0.5 mm sieve openings), 50 parts by weight of water and a foaming agent (0.06 part by weight in terms of the amount of aluminum) of a varied type. One type of the foaming agent comprises aluminum flakes alone and the other type is an aqueous aluminum paste composition same as of the present invention except that a fatty acid alkanolamide is omitted. The thus formed cement mortar were stirred for 3 minutes and then molded. The results are also shown in FIG. 1. From the results, it is clear that there is close similarly in foaming characteristics between the cement paste and the cement mortar. Illustratively stated, it was seen that in case there was observed no decrease in expansion rate with the cement paste for 30 minutes, (when the aluminum flakes were employed as the foaming agent), there was caused no decrease in expansion rate with the cement mortar, either, whereas in case there was obserbed decrease in expansion rate with the cement paste (when the aqueous aluminum paste composition without the fatty acid alkanolamide was employed), there was caused decrease in expansion rate or sinking with the cement mortar, too. Thus, the foaming characteristics of the cement mortar can be represented by those of the cement paste, and various tests in the following examples were conducted using a cement paste.

EXAMPLE 2

10 kg of small pieces of aluminum which had been prepared by melting and atomizing aluminum ingot to have an average size of smaller than 400$\mu$ and 10 kg of a mixture of mineral spirit and stearic acid (94:6 by weight) were charged into a ball mill and then were subjected to milling for about 6 hours. The resulting milled mixture was diluted with 20 kg of mineral spirit, put into a slurry tank and subjected to filtration using a filter press to obtain a filter cake containing 85% by weight of aluminum. 57.5 kg of an aqueous 0.25% by weight polyoxyethylene oleyl ether solution was added to 11.5 kg of the filter cake and the mixture was emulsified by agitating with DESPA (trade name of a high speed dissolver manufactured by Asada Tekko K.K., Japan) rotating at 1000 r.p.m. The emulsion was then subjected to filtration by the filter press. The thus obtained filter cake contained 88% by weight of a residue of heating at 105° C. for 3 hours, 10% by weight of water and 2% by weight of mineral spirit.

To 10 kg of the filter cake were added lauric acid diethanolamide (fatty acid alkanolamide of the formula (II)) in amount of 0.3% by weight based on the weight of the aluminum contained in the filter cake and water in such an amount that the weight percentage of the residue of heating is reduced to 65%. The thus obtained formulation was kneaded by a R-type ribbon blender manufactured by Tokuju Kosakusho, Japan, at 45° C. for about 30 minutes to obtain a desired aqueous aluminum paste composition which is excellent in water dispersibility, water stability and bubble retention.

In order to observe foaming characteristics of the obtained aqueous aluminum paste composition used as a foaming agent for cement, the same test as mentioned in Example 1 was conducted. The aqueous aluminum paste composition obtained in this Example showed good foaming characteristics and any change in characteristics of the aluminum paste composition was not observed even after more than one-year storage.

For comparison, an aqueous aluminum paste composition was prepared in the same manner as described above, except that use of lauric acid diethanolamide was omitted and, the same foaming test as mentioned above was conducted. The thus prepared paste composition without lauric acid diethanolamide incorporated, had good water dispersibility and water stability. But, when the cement paste including such composition is expanded, the degree of degassing was so violent that the cement paste collapsedly sank in the course of expansion thereof.

EXAMPLE 3

10 kg of small pieces of aluminum which had been prepared by melting and atomizing aluminum ingot to have an average size of smaller than 400$\mu$ and 10 kg of a mixture of mineral spirit and stearic acid (96:4 by weight) were charged into a ball mill and then were subjected to milling for about 6 hours. The resulting milled mixture was diluted with 20 kg of mineral spirit, put into a slurry tank and subjected to filtration using a filter pass. The obtained filter cake contained 93% by weight of a residue of heating at 105° C. for 3 hours and 7% by weight of mineral spirit.

To 10 kg of the filter cake were added oleic acid diethanolamide (fatty acid alkanolamide of the formula (I)) in an amount of 0.1% by weight and polyoxyethylene nonyl phenol ether in an amount of 3% by weight, each based on the weight of the aluminum contained in the filter cake, and water in such an amount that the weight percentage of the residue of heating is reduced to 65%. The thus obtained formulation was kneaded by a R-type ribbon blender manufactured by Tokuju Kosakusho, Japan at 45° C. for about 30 minutes to obtain a desired aqueous aluminum paste composition which is excellent in water dispersibility, water stability and bubble retention.

Foaming characteristics of the obtained aqueous aluminum paste composition used as a foaming agent for cement were observed by the same test as mentioned in Example 1. It was observed that the aqueous aluminum paste composition obtained in this Example had good foaming characteristics and was not deteriorated even after more than one-year storage.

For comparison, an aqueous aluminum paste composition was prepared in the same manner as described above, except that use of oleic acid diethanolamide was omitted, and the same foaming test as mentioned above was conducted. The thus prepared paste composition without oleic acid diethanolamide incorporated, had good water dispersibility and water stability. But, when the cement paste including such composition is expanded, the degree of degassing was so violent that the cement paste collapsedly sank in the course of expansion thereof.

EXAMPLE 4

Aluminum flakes were obtained by distilling off the remaining solvent, in a drying column with a tray under vacuum, from the filter cake obtained in Example 3 and containing 93% by weight of residue of heating at 105° C. for 3 hours.

To 10 kg of the prepared aluminum flakes were added oleic acid diethanolamide (fatty acid alkanolamide of the formula (II)) in an amount of 0.1% by weight and polyoxy ethylene nonyl phenol ether in an amount of 2% by weight, each based on the weight of the aluminum contained in the filter cake, and water in such an amount that the weight percentage of the residue of heating is reduced to 65%. The thus obtained formulation was kneaded by a R-type ribbon blender manufactured by Tokuju Kosakusho, Japan at 45° C. for about 30 minutes to obtain a desired aqueous aluminum paste composition which is excellent in water dispersibility, water stability and bubble retention.

Foaming characteristics of the obtained aqueous aluminum paste composition used as a foaming agent for cement paste were observed by the same test as mentioned in Example 1. It was seen that the aqueous aluminum paste composition obtained in this Example had good foaming characteristics and was not deteriorated even after more than one-year storage.

For comparison, an aqueous aluminum paste composition was prepared in the same manner as described above, except that use of oleic acid diethanolamide was omitted, and the same test as mentioned above was conducted. The thus prepared paste composition without oleic acid diethanolamide incorporated, had good water dispersibility and water stability. But, when the cement paste including such composition is expanded, the degree of degassing was so violent that the cement paste collapsedly sank in the course of expansion thereof.

EXAMPLE 5

10 kg of small pieces of aluminum which had been prepared by melting and atomizing aluminum ingot to have an average size of about 400μ and 10 kg of a mixture of mineral spirit and stearic acid (96:4 by weight) were charged into a ball mill and then were subjected to milling for about 6 hours. The resulting milled mixture was diluted with 20 kg of mineral spirit, put into a slurry tank and subjected to filtration using a filer press. The obtained filter cake contained 93% by weight of a residue of heating at 105° C. for 3 hours and 7% by weight of mineral spirit.

To 10 kg of the filter cake were added oleic acid diethanolamide (fatty acid alkanolamide of the formula (I)) in amount of 0.05% by weight and polyoxyethylene nonylphenol ether in an amount of 3% by weight, each based on the weight of aluminum contained in the filter cake and water in such an amount that the weight percentage of the residue of heating is reduced to 65%. The thus obtained formulation was kneaded by a R-type ribbon blender manufactured by Tokuju Kosakusho, Japan, at 45° C. for about 30 minutes to obtain a desired aqueous aluminum paste composition which is excellent in water dispersibility, water stability and bubble retention.

Foaming characteristics of the obtained aqueous aluminum paste composition used as a foaming agent for cement were observed by the same test as mentioned in Example 1. The aqueous aluminum paste composition obtained in this Example showed good foaming characteristics, and any change in characteristics of the aluminum paste composition was not observed even after more than one-year storage.

For comparison, an aqueous aluminum paste composition was prepared in the same manner as described above, except that oleic acid diethanolamide was used in an amount of 1.5% by weight based on the aluminum instead of in the amount of 0.05% by weight. As the result of the same test as mentioned above, it was observed that the thus prepared paste composition was inferior in water stability. Stated illustratively, there was observed gas generation in one-month storage at room temperature and it turned out that this paste composition was not proper for practical use. Further, when the cement paste including such composition is expanded, the degassing was so violent that the appearance of the foamed product was much spoiled.

EXAMPLE 6

10 kg of small pieces of aluminum which had been prepared by melting and atomizing aluminum ingot to have an average size of about 400μ and 10 kg of a mixture of solvent naphtha and oleic acid (98:2 by weight) were charged into a ball mill and then were subjected to milling for about 6 hours. The resulting milled mixture was diluted with 20 kg of solvent naphtha, put into a slurry tank and subjected to filtration using a filter press. The obtained filter cake contained 91% by weight of a residue of heating at 105° C. for 3 hours and 9% by weight of mineral spirit.

To 10 kg of the filter cake were added oleic acid monoisopropanolamide (fatty acid alkanolamide of the formula (I)) in an amount of 0.1% by weight, lauric acid diethanolamide (fatty acid alkanolamide of the formula (II)) in an amount of 0.1% by weight and polyoxyethylene monolaurate in an amount of 2.5% by weight, the weight % being based on the weight of the aluminum contained in the filter cake, and water in such an amount that the weight percentage of the residue of heating is reduced to 65%. The thus obtained formulation was kneaded by a R-type ribbon blender manufactured by Tokuju Kosakusho, Japan, at 30° C. for about 30 minutes to obtain a desired aqueous aluminum paste composition which is excellent in water dispersibility, water stability and bubble retention.

Foaming characteristics of the obtained aqueous aluminum paste composition used as a foaming agent for cement were observed by the same test as mentioned in Example 1. The aqueous aluminum paste composition obtained in this Example attained good foaming characteristics and any change in characteristics of the aluminum paste composition was not observed even after more than one-year storage.

For comparison, an aqueous aluminum paste composition was prepared in the same manner as described above, except that use of the fatty acid alkanolamides was omitted, and the same test as mentioned above was conducted. The thus prepared paste composition without the fatty acid alkanolamides incorporated, had good water dispersibility and water stability. But, when the cement paste including such composition is expanded, the degree of degassing was so violent that the cement paste collapsedly sank in the course of expansion thereof.

EXAMPLE 7

10 kg of small pieces of aluminum which had been prepared in the same manner as in Example 2 and 10 kg of a mixture of mineral spirit and stearic acid (97:3 by weight) were charged into a ball mill and then were subjected to milling for about 6 hours. The resulting milled mixture was diluted with 20 kg of mineral spirit and the diluted mixture was put into a slurry tank and subjected to filtration using a filter press. The obtained filter cake contained 93% by weight of a residue of heating at 105° C. for 3 hours, 7% by weight of mineral spirit.

To observe the effects of the fatty acid alkanolamide and the nonionic surface active agent, there were added, to 10 kg of the filter cake, lauric acid diethanolamide (fatty acid alkanolamide of the formula (I)) and polyoxyethylene oleyl ether in varied amounts as indicated in Table 1 and water in such an amount that the weight percentage of the residue of heating is reduced to 65%. The thus obtained formulation was kneaded in the same manner as in Example 1 to obtain a desired aqueous aluminum paste composition.

The dispersibilities of the obtained aqueous aluminum paste compositions in water, with respect to easiness, were visually observed and the results are shown in Table 1. Further, the aqueous dispersions of the paste compositions were allowed to stand in settlers for one day and the dispersion stabilities were visually (with respect to less occurrence of aggregation) observed and the results are also shown in Table 1. On the other hand, 13 g (in terms of the amount of aluminum) each of sample aluminum paste compositions was taken in a 200 ml Erlenmeyer flask and 100 ml of ion exchange-treated water was added. The flask was violently shaken to disperse the sample paste composition in water. The sample aluminum paste compositions each contain 3.00 parts by weight in total of lauric acid diethanolamide and polyoxyethylene oleyl ether per 100 parts by weight of aluminum flakes. Messpipets with rubber seals were fitted to the Erlenmeyer flasks and kept in constant temperature baths of 50° C., respectively. The gas generation was measured with lapse of time. As a blank, an aqueous dispersion of the paste composition with aluminum flakes, fatty acid and fatty acid alkanolamide removed was employed. The results are shown in Table 1 and FIG. 3. In FIG. 3, the amount of gas generated by the use of the respective paste compositions are denoted relative to the amount of gas generated in the blank test. The foaming characteristics of cement pastes were examined in the same manner as in Example 1 and the results are shown in Table 1 and FIG. 4.

With respect to water dispersibility, it is apparently seen from Table 1 that when a fatty acid alkanolamide alone is contained in the paste composition, at least 1.5 parts by weight of fatty acid alkanolamide should be employed per 100 parts by weight of aluminum flakes contained in the paste composition. On the other hand, it was observed as shown in Table 1 and FIG. 3 that water stability was much lowered when the amount of fatty acid alkanolamide exceeded 1.5 parts by weight per 100 parts by weight of aluminum flakes contained in the paste composition, whether it was employed alone or in combination with a nonionic surface active agent. Besides, with respect to foaming characteristics of cement pastes, it is apparent from Table 1 and FIG. 4 that the amount of fatty acid alkanolamide is of a critical nature. Thus, it turned out that the aqueous aluminum paste compositions containing therein specific amounts of fatty acid alkanolamide and nonionic surface active agent in combination had well-balanced characteristics of water dispersibility, water stability and excellent foaming characteristics.

Table 1

Effects of fatty acid alkanolamide and nonionic surface active agent

| | amount added, wt. part per 100 parts by weight of the aluminum contained | | water dispersibility[*1] | | water[*2] | foaming[*3] |
|---|---|---|---|---|---|---|
| | lauric acid diethanolamide | polyoxyethylene oleyl ether | easy dispersibility | dispersion stability | stability (50° C × 20 hrs) | characteristics of cement paste |
| Comparative example | 0.25 | 0 | −− | −− | ++ | − |
| " | 1.00 | 0 | − | −− | ++ | − |
| " | 1.50 | 0 | ++ | ++ | −− | + |
| " | 3.00 | 0 | ++ | ++ | −− | −− |
| " | 2.00 | 1.00 | ++ | ++ | −− | −− |
| " | 1.50 | 1.50 | ++ | ++ | −− | ++ |
| Present invention | 1.00 | 2.00 | ++ | ++ | ++ | ++ |
| " | 0.25 | 2.75 | ++ | ++ | ++ | ++ |
| Comparative example | 0 | 3.00 | ++ | ++ | ++ | −− |

Note:
[*1] The water dispersibility was evaluated in two aspects, namely by visual inspection of dispersion easiness of the aluminum paste composition in water (referred to as "easy dispersibility") and visual inspection of less occurrence of aggregation upon having allowed the aluminum paste composition to stand for one day in a settler (referred to as "dispersion stability").
[*2] The water stability of the aluminum paste composition was evaluated by the amount of gas generated when the paste composition was kept in water at 50° C for 20 hours in the instrument as shown in FIG. 2.
[*3] The foaming characteristics were evaluated upon foaming according to the same test method as in Example 1.
The evaluation symbols shown in Table 1 have meanings as given below.

| easy dispersibility: | "++" | well dispersed |
| | "−" | slightly dispersed |
| | "−−" | not dispersed |
| dispersion stability: | "++" | good |
| | "−−" | aggregated |
| water stability: | "++" | good |

Table 1-continued

Effects of fatty acid alkanolamide and nonionic surface active agent

| amount added, wt. part per 100 parts by weight of the aluminum contained | | water dispersibility[1] | | water[2] | foaming[3] |
|---|---|---|---|---|---|
| lauric acid diethanol-amide | polyoxyethylene oleyl ether | easy dispersibility | dispersion stability | stability (50° C × 20 hrs) | characteristics of cement paste |
| foaming characteristics: | | "— —" | | poor | |
| | | "+ +" | | good | |
| | | "+" | | fairly good | |
| | | "— —" | | sank | |
| | | "—" | | The foaming test could not be conducted properly because of poor water dispersibility | |

EXAMPLE 8

The same procedures as in Example 3 were repeated except that the kinds of fatty acids, fatty acid alkanolamides and nonionic surface active agents were varied, to prepare aqueous aluminum paste compositions. With these prepared paste compositions, tests of water dispersibility, water stability and foaming characteristics of cement pastes were conducted in the same manner as in Example 7 and the results are summarized in Table 2.

EXAMPLE 9

The same procedures as in Example 7 were repeated except that the amounts of fatty acid alkanolamide and nonionic surface active agent were varied, to prepare aqueous aluminum paste compositions. With these prepared paste compositions, tests of water dispersibility, water stability and foaming characteristics of cement pastes were conducted in the same manner as in Example 7 and the results are summarized in Table 3.

Table 2

| | fatty acid | fatty acid alkanolamide | nonionic surface active agent | water dispersibility | | water stability (50° C × 20 hrs) | foaming characteristics of cement paste |
|---|---|---|---|---|---|---|---|
| | | | | easy dispersibility | dispersion stability | | |
| | lauric acid | oleic acid diethanolamide | polyoxyethylene lauryl ether | good | good | good | good |
| | behenic acid | " | " | " | " | " | " |
| | stearic acid | lauric acid monoethanolamide | polyoxyethylene oleyl ether | " | " | " | " |
| | " | oleic acid monoethanolamide | " | " | " | " | " |
| | " | stearic acid diethanolamide | " | " | " | " | " |
| | " | soybean oil fatty acid diethanolamide | " | " | " | " | " |
| present invention | " | lauric acid diethanolamide | polyoxyethylene octyl ether | " | " | " | " |
| | " | " | polyoxyethylene dodecyl phenyl ether | " | " | " | " |
| | " | " | polyethylene glycol monoleate | " | " | " | " |
| | " | " | polyoxyalkylene lauryl ether (weight ratio of PO/EO = 20/80, random type) | " | " | " | " |
| comparative example | " | none | polyoxyethylene oleyl ether | " | " | " | sank |
| comparative example | " | lauric acid diethanolamide | none | not dispersed | — | — | — |

Table 3

| | amount added, wt. parts per 100 parts by weight of the aluminum contained | | water dispersibility | | water stability (50° C × 20 hrs) | foaming characteristics of cement paste |
|---|---|---|---|---|---|---|
| | lauric acid diethanolamide | polyoxyethylene oleyl ether | easy dispersibility | dispersion stability | | |
| comparative example | 1.05 | 3.00 | ++ | ++ | — | — |
| present invention | 0.50 | 3.00 | ++ | ++ | ++ | ++ |
| " | 0.05 | 3.00 | ++ | ++ | ++ | ++ |
| comparative example | 0 | 3.00 | ++ | ++ | ++ | — — |
| present invention | 0.50 | 4.00 | ++ | ++ | ++ | + |
| comparative example | 0.50 | 4.50 | ++ | ++ | ++ | — — |
| present invention | 1.00 | 0.50 | + | + | ++ | + |

Table 3-continued

| | amount added, wt. parts per 100 parts by weight of the aluminum contained | | water dispersibility | | water stability (50° C × 20 hrs) | foaming characteristics of cement paste |
|---|---|---|---|---|---|---|
| | lauric acid diethanolamide | polyoxyethylene oleyl ether | easy dispersibility | dispersion stability | | |
| comparative example | 1.00 | 0.25 | — | — — | + + | — |
| " | 0.10 | 0.70 | — | — — | + + | — |

The evaluation symbols shown in Table 3 have meanings as given below.

easy dispersibility:
- "+ +"  well dispersed
- "+"  fairly well dispersed
- "—"  sightly dispersed dispersion stability:
- "+ +"  good
- "+"  fairly good
- "— —"  aggregation water stability:
- "+ +"  good
- "—"  slightly poor foaming characteristics:
- "+ +"  good
- "+"  fairly good
- "—"  slightly sank
- "— —"  sank
- "—"  The foaming test could not be conducted properly because of poor water dispersability.

What is claimed is:

1. An aqueous aluminum paste composition comprising 100 parts by weight of aluminum flakes, 0.1 to 10 parts by weight of at least one fatty acid, 0.01 to 1.0 part by weight of at least one fatty acid alkanolamide, 0.5 to 4.0 parts by weight of a nonionic surface active agent other than the fatty acid alkanolamide and water in an amount sufficient to render the composition pasty, the total amount of the fatty acid alkanolamide and the nonionic surface active agent being at least 1.0 part by weight.

2. An aqueous aluminum paste composition according to claim 1, wherein the fatty acid is a member selected from the group consisting of saturated fatty acids having 6 to 24 carbon atoms, unsaturated fatty acids having 6 to 24 carbon atoms and mixtures thereof.

3. An aqueous aluminum paste composition according to claim 1, wherein the fatty acid is a normal saturated fatty acid having 12 to 22 carbon atoms.

4. An aqueous aluminum paste composition according to claim 1, wherein the aluminum flakes have a size that the sieve residue on a sieve having 149μ sieve openings is 5% or less.

5. An aqueous aluminum paste composition according to claim 1, wherein the amount of the fatty acid alkanolamide is 0.1 to 0.5 part by weight.

6. An aqueous aluminum paste composition according to claim 1, wherein the fatty acid alkanolamide is a fatty acid dialkanolamide.

7. An aqueous aluminum paste composition according to claim 6, wherein the fatty acid dialkanolamide is a fatty acid diethanolamide.

8. An aqueous aluminum paste composition according to claim 1, wherein the nonionic surface active agent is a member selected from the group consisting of a polyoxyethylene alkyl ether, a polyoxyethylene alkylphenol ether, a polyethylene glycol fatty acid ester, a block copolymer of ethylene oxide and propylene oxide, and mixtures thereof.

9. In the production of light-weight foamed concrete comprising mixing a concrete-forming composition and a foaming agent, and allowing the foamed concrete to set, the improvement which comprises employing as said foaming agent an aqueous aluminum paste composition according to claim 1.

* * * * *